(12) United States Patent
Onuki et al.

(10) Patent No.: US 8,531,584 B2
(45) Date of Patent: Sep. 10, 2013

(54) IMAGE-PICKUP APPARATUS

(75) Inventors: Kenji Onuki, Tokyo (JP); Yoshinobu Sato, Yokohama (JP); Takeshi Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/336,766

(22) Filed: Dec. 23, 2011

(65) Prior Publication Data

US 2012/0113314 A1    May 10, 2012

Related U.S. Application Data (63) Continuation of application No. 12/328,559, filed on Dec. 4, 2008, now Pat. No. 8,085,337.

(30) Foreign Application Priority Data

Dec. 13, 2007    (JP) .................................. 2007-322648

(51) Int. Cl.
*G03B 13/00* (2006.01)
*H04N 5/232* (2006.01)

(52) U.S. Cl.
USPC ........................................................ 348/345

(58) Field of Classification Search
USPC .............. 348/349–356, 345, 220.1, 169, 152, 348/155, 208.11, 264, 333.09; 396/80, 79, 396/82, 93, 103, 104, 107, 121, 124, 139, 396/150, 151
See application file for complete search history.

(56) References Cited

U.S. PATENT DOCUMENTS

| 2007/0237511 A1* | 10/2007 | Kusaka ......................... 396/111 |
| 2008/0267601 A1* | 10/2008 | Kobayashi ...................... 396/91 |

* cited by examiner

*Primary Examiner* — Roberto Velez
*Assistant Examiner* — Stephen Coleman
(74) *Attorney, Agent, or Firm* — Cowan, Liebowitz & Latman, P.C.

(57) ABSTRACT

The image-pickup apparatus includes an image acquiring part respectively photoelectrically converting first and second object images respectively formed by first and second light fluxes into first image data and second image data, the first and second light fluxes being formed by dividing a light flux from an image-pickup optical system by a pupil divider, and photoelectrically converting a third object image formed by a third light flux of the light flux from the image-pickup optical system into third image data, the third light flux being not divided by the pupil divider, and a split image generating part which generates split image data to be displayed in the third image data. The split image generating part generates the split image data based on the first image data and the second image data, and adds color information extracted from the third image data to the split image data.

6 Claims, 9 Drawing Sheets

(a) IMAGE-FORMING POSITION (b) POSITIONAL DIFFERENCE AMOUNT

IMAGE-PICKUP APPARATUS

CROSS-REFERENCE TO RELATED APPLICATION

This application is a continuation of application Ser. No. 12/328,559, filed Dec. 4, 2008, the entire disclosure of which is hereby incorporated by reference.

BACKGROUND OF THE INVENTION

The present invention relates to an image-pickup apparatus such as a digital camera or a video camera, and in particular, to an image-pickup apparatus having a function of displaying a split image serving as a guide image for manual focusing. Focus detection methods in image-pickup apparatuses include a phase difference detection method (pupil division method) that calculates a defocus amount of an image-pickup optical system on the basis of a positional difference amount (a phase difference) between two images formed by light fluxes that passes through two areas different from each other in the image-pickup optical system. Moreover, Japanese Patent Laid-Open No. 2000-156823 discloses an image-pickup apparatus in which image-pickup pixels and focus detection pixels are arranged in a single image-pickup element to perform focus detection by the phase difference detection method without using a sensor dedicated for focus detection.

On the other hand, when a user performs manual focusing, displaying a guide image (focus guide image) for assisting a manual focusing operation enables the user to easily perform the manual focusing.

Japanese Patent Laid-Open No. 59-50671, Japanese Patent Laid-Open No. 2006-154506, and Japanese Patent Laid-Open No. 2001-309210 disclose an image-pickup apparatus that electrically generates and displays on an electrical viewfinder a focus guide image (hereinafter referred to as a split image) corresponding to an optical split image which has been employed for optical viewfinders of film cameras.

The image-pickup apparatus disclosed in Japanese Patent Laid-Open No. 59-50671 photoelectrically converts, by a focus detecting image-pickup element, two object images formed by light fluxes pupil-divided to obtain two electrical images (hereinafter referred to as two pupil-divided images). Then, the image-pickup apparatus synthesizes these pupil-divided images with a normal image (hereinafter referred to as a main image) obtained by an image-pickup element for image capturing to display a split image corresponding to a phase difference of the pupil-divided images in the main image.

The image-pickup apparatus disclosed in Japanese Patent Laid-Open No. 2006-154506 controls a voltage to be applied to a liquid crystal diffractive grating element through which a light flux passes, to display a focus state of an image-pickup optical system of the image-pickup apparatus by the split image.

The image-pickup apparatus disclosed in Japanese Patent Laid-Open No. 2001-309210 calculates a defocus amount of an image-pickup optical system of the image-pickup apparatus and transforms part of a main image into an image like the split image in accordance with the calculation result.

However, the image-pickup apparatus disclosed in Japanese Patent Laid-Open No. 59-50671 generates the split image using the pupil-divided images which have luminance (brightness) information, but have no color information. Therefore, directly displaying the split image in the main image that is a color image displays an unnatural image with no color in only a portion of the split image, which brings an odd feeling to a user. The image-pickup apparatus disclosed in Japanese Patent Laid-Open No. 2000-156823 in which the focus detection pixels arranged in the single image-pickup element output only luminance information has this same point.

The image-pickup apparatus disclosed in Japanese Patent Laid-Open No. 2006-154506 is capable of displaying a color split image. However, this image-pickup apparatus uses the liquid crystal diffractive grating element which is a special element, and that point brings complexity of the configuration and high-cost of the image-pickup apparatus.

Moreover, the image-pickup apparatus disclosed in Japanese Patent Laid-Open No. 2001-309210 as well is capable of displaying a color split image. However, this image-pickup apparatus calculates a defocus amount on the basis of distance-measuring information which is a result of measuring a distance up to an object and lens position information in the image-pickup optical system, to display the split image in accordance with the defocus amount. Therefore, when plural objects exist which have mutually different distances in one split image, it is difficult to display the split image, which makes it difficult to perform manual focusing in the image-pickup apparatus.

BRIEF SUMMARY OF THE INVENTION

The present invention provides an image-pickup apparatus and an image display method each of which is capable of displaying a color split image without using a special element and easy to perform manual focusing.

The present invention provides as one aspect thereof an image-pickup apparatus that includes an image acquiring part which respectively photoelectrically converts a first object image and a second object image that are formed by a first light flux and a second light flux into first image data and second image data, the first and second light fluxes being formed by dividing a light flux from an image-pickup optical system by a pupil divider, and which photoelectrically converts a third object image formed by a third light flux of the light flux from the image-pickup optical system into third image data, the third light flux being not divided by the pupil divider, a displaying part which displays the third image data, and a split image generating part which generates split image data to be displayed in the third image data. The split image generating part generates the split image data based on the first image data and the second image data, and adds color information extracted from the third image data to the split image data.

The present invention provides as another aspect thereof an image display method for an image pickup-apparatus having a displaying part. The method includes a first step of respectively photoelectrically converting a first object image and a second object image that are formed by a first light flux and a second light flux into first image data and second image data, the first and second light fluxes being formed by dividing a light flux from an image-pickup optical system by a pupil divider, and which photoelectrically converting a third object image formed by a third light flux of the light flux from the image-pickup optical system into third image data, the third light flux being not divided by the pupil divider, and a second step of generating split image data to be displayed in the third image data displayed on the displaying part. The second step adds color information extracted from the third image data to the split image data.

Other aspects of the present invention will be apparent from the embodiments described below with reference to the drawings

DETAILED DESCRIPTION OF THE EMBODIMENTS

Exemplary embodiments of the present invention will be described below with reference to the accompanied drawings.

[Embodiment 1]

Figure 1:
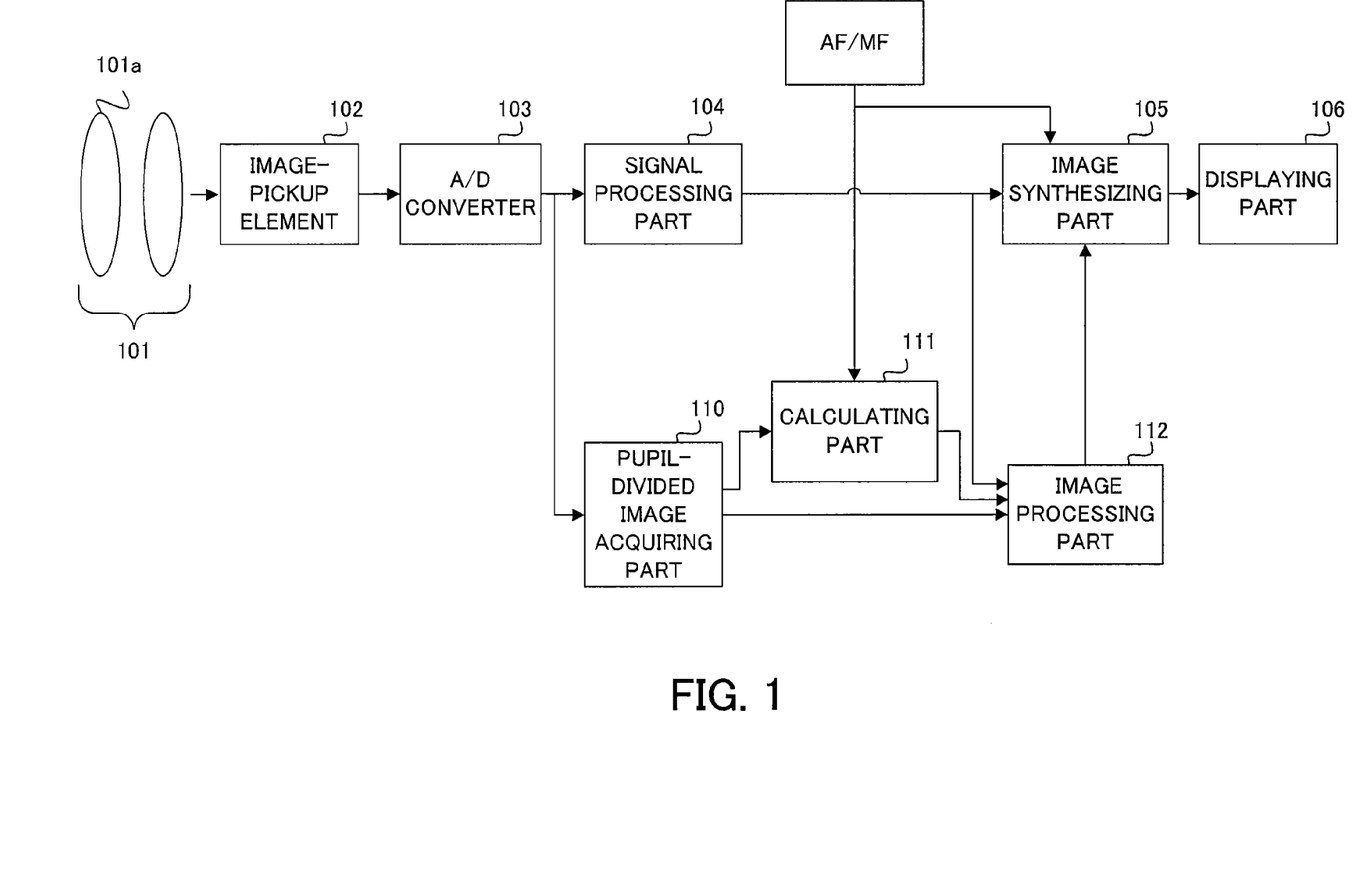
FIG. 1 is a block diagram showing the configuration of a camera that is a first embodiment (Embodiment 1) of the present invention.

FIG. 1 shows the configuration of a digital camera (image-pickup apparatus) that is a first embodiment (Embodiment 1) of the present invention. The digital camera includes a digital still camera and a video camera. In this embodiment, the digital still camera will be described.

In FIG. 1, reference numeral 101 denotes an image-pickup optical system including a focus lens 101a. Reference numeral 102 denotes an image-pickup element such as a CCD sensor or a CMOS sensor. Reference numeral 103 denotes an A/D converter which converts an analog signal output from the image-pickup element 102 into a digital signal.

Reference numeral 104 denotes a signal processing part which performs various kinds of image processing such as color conversion processing onto the signal output from the A/D converter 103 to generate image data. The signal processing part 104 generates a main image (third image data) serving as a normal captured image (recording image) on the basis of signals from image-pickup pixels which will be described later in the image-pickup element 102.

Reference numeral 110 is a pupil-divided image acquiring part. The pupil-divided image acquiring part 110 generates A-image data (first image data) and B-image data (second image data) corresponding to two pupil-divided images (hereinafter referred to as an A-image and a B-image) having a phase difference therebetween in an out-of-focus state of the image-pickup optical system 101 on the basis of image signals from focus detection pixels which will be described later in the image-pickup element 102.

The image-pickup element 102 to the signal processing part 104, and the pupil-divided image acquiring part 110 constitute an image acquiring part. Further, the camera has a focus mode switch 120 which switches a focus mode between an autofocus mode for performing autofocus of the image-pickup optical system 101 and a manual focus mode for allowing a user to perform manual focus thereof.

Figure 2:
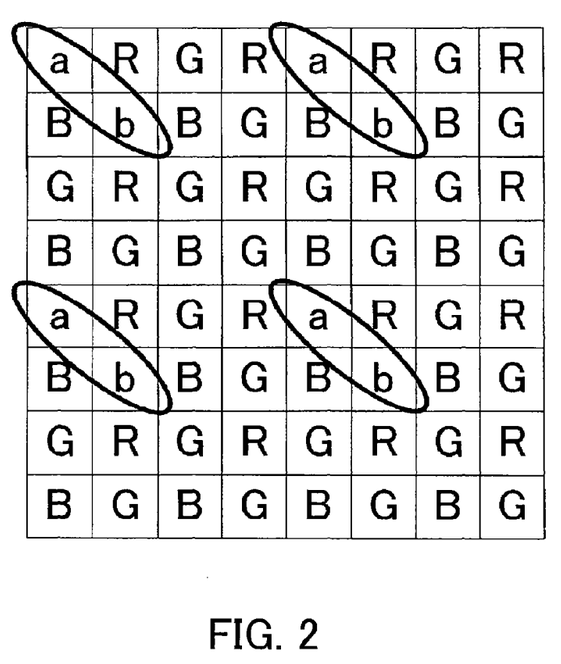
FIG. 2 is a diagram showing a pixel arrangement of image-pickup pixels used in Embodiment 1.

FIG. 2 shows a pixel arrangement in part of the image-pickup element 102. This single image-pickup element 102 has the image-pickup pixels (third pixels) denoted by R, G, and B, and the focus detection pixels (first pixels and second pixels) denoted by a and b.

For each of a green pixel G, a red pixel R, and a blue pixel B among the image-pickup pixels, a color filter through which a color light flux corresponding thereto passes is provided in its aperture, and a photoelectric converting part is provided on a back side of the color filter. Further, a microlens is provided on a front side of the color filter. The photoelectric converting part, the color filter, and the microlens constitute one image-pickup pixel.

Part of the green pixels G of the image-pickup pixels are substitute by the focus detection pixels a and b. Focus detection pixels a and b obliquely adjacent to each other form a pair, and plural pairs of the focus detection pixels a and b are discretely arranged in the image-pickup element 102 (that is, in the focus detection pixels). No color filters are provided for the focus detection pixels a and b, which prevents deterioration in sensitivity for focus detection.

Hereinafter, the image signals obtained by photoelectric conversion in the focus detection pixels a and b are respectively referred to as an A-image signal and a B-image signal.

In order to generate two images having a phase difference, i.e., a positional difference therebetween, it is necessary to separate a light flux from the image-pickup optical system into a light flux L1 and a light flux L2 (refer to FIGS. 3 and 4) passing through areas different from one another (pupils different from one another) in a pupil of the image-pickup optical system 101. In the present embodiment, disposing the focus detection pixels a and b having a pupil dividing function on the image-pickup element 102 generates the light flux L1 and the light flux L2.

Figure 6:
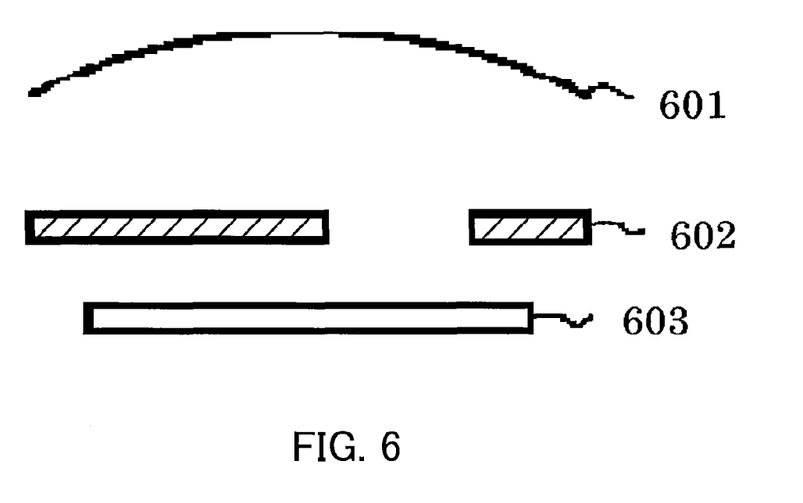
FIG. 6 is a diagram showing the structures of a focus detection pixel in the image-pickup element of FIG. 2.
Figure 7:
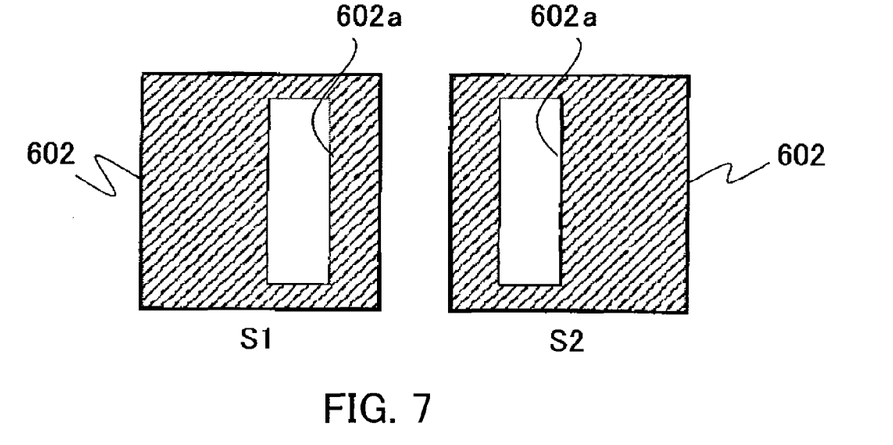
FIG. 7 is a diagram showing light-shielding films provided for the focus detection pixel.

FIG. 6 shows the cross-sectional structures of the focus detection pixels a and b (hereinafter denoted by S1 and S2). Reference numeral 601 denotes a microlens, reference numeral 602 denotes a light-shielding film, and reference numeral 603 denotes a photoelectric converting part. FIG. 7 shows the light-shielding films 602 provided to the focus detection pixels S1 and S2 viewed from a direction of an optical axis (optical axis direction) of the microlens 601. The light-shielding films 602 of the focus detection pixels a and b have apertures 602a decentered so that the apertures 602a are opposite to each another, i.e., symmetric with respect to the optical axis of the microlens 601 (with respect to the center of the photoelectric converting part 603). Providing the light-shielding films 602 forms a pupil divider.

With such a structure, the light flux L1 reaching the photoelectric converting part 603 in the focus detection pixel S1 and the light flux L2 reaching the photoelectric converting part 603 in the focus detection pixel S2 are light fluxes from the pupils different from one another, that is, pupil-divided light fluxes. This is equivalent to symmetrical division of the pupil of the image-pickup optical system when the image-pickup optical system is viewed from the focus detection pixel S1 and the focus detection pixel S2. The light flux L1 and the light flux L2 form object images at positions symmetrical with respect to the center of the photoelectric converting part 603 when the photoelectric converting parts 603 where the light flux L1 and the light flux L2 reach are viewed in an overlapping manner.

Photoelectric conversion of an object image (A-image: first object image) formed on the photoelectric converting part 603 in the focus detection pixel S1 provides the A-image signal. Further, photoelectric conversion of an object image (B-image: second object image) formed on the photoelectric converting part 603 in the focus detection pixel S2 provides the B-image signal.

Moreover, photoelectric conversion of an object image (third object image) formed by a light flux which is not pupil-divided on the image-pickup pixels by the image-pickup pixels provides an image signal to generate the main image.

Figure 3:
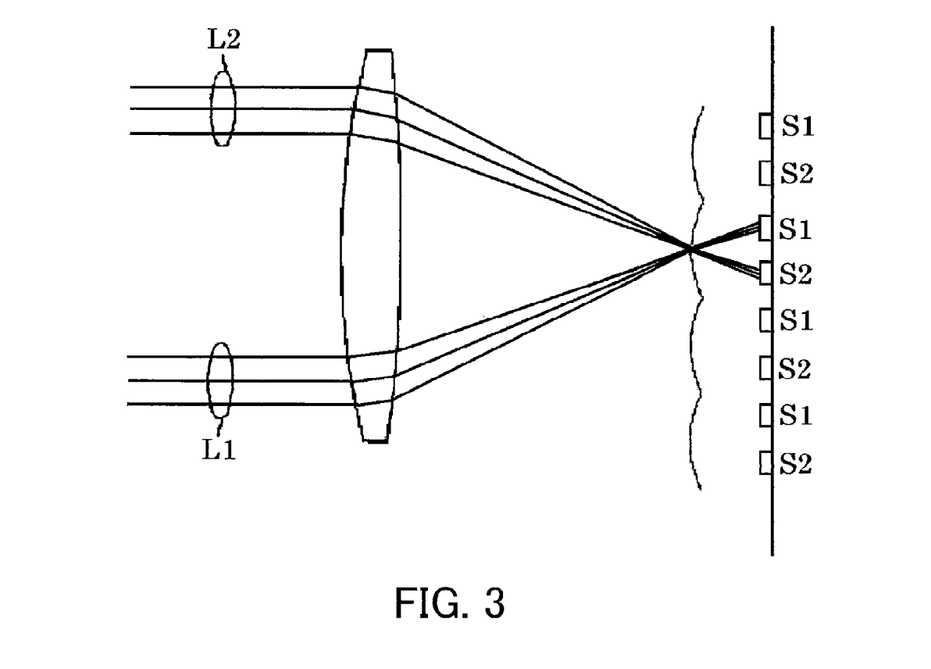
FIG. 3 is a diagram showing the principle of focus detection in Embodiment 1 (in-focus state).
Figure 4:
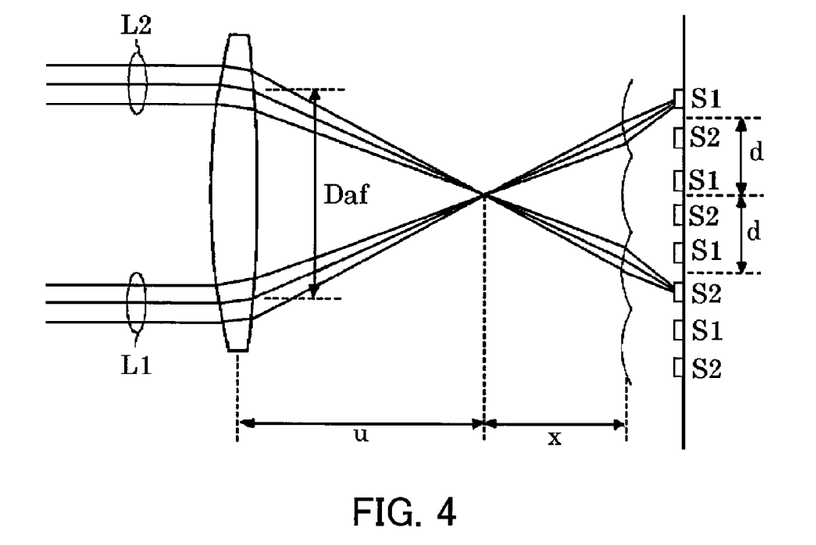
FIG. 4 is a diagram showing the principle of focus detection in Embodiment 1 (out-of-focus state).

FIGS. 3 and 4 show the principle of focus detection by a phase difference detection method. A light flux from a specific point of an object (light flux from the image-pickup optical system) is divided into the light flux (first light flux) L1 passing through the divided pupil for the focus detection pixel S1 to enter the pixel S1 and the light flux (second light flux) L2 passing through the divided pupil for the focus detection pixel S2 to enter the pixel S2.

These two pupil-divided light fluxes L1 and L2 converge on one point on a surface of the microlens as shown in FIG. 3 when the image-pickup optical system 101 is in an in-focus state. In this state, the A-image and the B-image are formed so as to be coincident to one another (that is, with no positional difference) on the focus detection pixels S1 and S2. Accordingly, a phase difference between the A-image and the B-image read from the focus detection pixels S1 and S2 is zero.

On the other hand, when the image-pickup optical system 101 is in an out-of-focus state, as shown in FIG. 4, the light fluxes L1 and L2 intersect with one another at a position different from the surface of the microlens. In this state, the A-image formed on the focus detection pixel S1 and the B-image formed on the focus detection pixel S2 has a positional difference (phase difference) therebetween.

A distance from the surface of the microlens to the intersecting point of the two light fluxes L1 and L2, i.e., a defocus amount is defined as x, the phase difference is defined as n pixels, and a pixel pitch is defined as d. Further, a distance between the pupil for the pixel S1 and the pupil for the pixel S2 is defined as Daf, and a distance from a principal point of the image-pickup optical system 101 to a focal position thereof is defined as u.

The defocus amount x is calculated by:

$$X = n \times d \times u / Daf.$$

Moreover, because the distance from the principal point to the focal position u may be substantially equal to a focal length f of the image-pickup optical system 101, the defocus amount X can be calculated by:

$$X = n \times d \times f / Daf.$$

Figure 8:
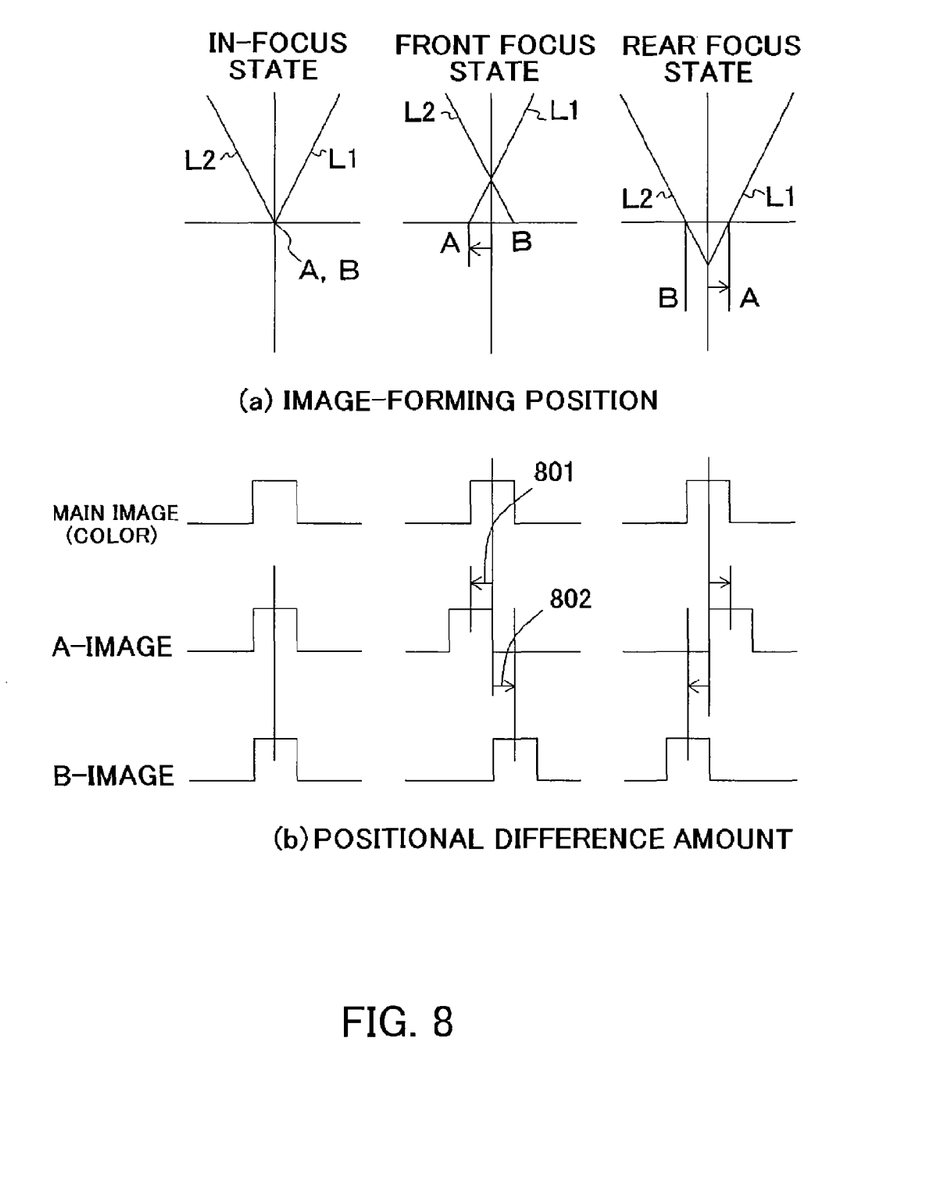
FIG. 8 is a diagram showing a relationship between focus states of an image-pickup optical system and a positional difference of two pupil-divided light fluxes forming two images.

The upper figure in FIG. 8 shows a relationship among focus states (an in-focus state, a front focus state, and a rear focus state) of the image-pickup optical system 101 and image-forming positions (positions of the A-image and the B-image) of the light fluxes L1 and L2. Directions of the positional difference between the A-image and the B-image in the front focus state and in the rear focus state are different from each other.

The lower figure in. FIG. 8 shows the image signal of the main image (image signal read from the image-pickup pixels) and the A-image signal and the B-image signal read from the focus detection pixels S1 and S2 in the respective focus states. The horizontal axis shows phases of the image signals, and the vertical axis shows luminances thereof. Reference numerals 801 and 802 denote positional difference amounts of the A-image signal and the B-image signal from the image signal of the main image.

In FIG. 1, reference numeral 111 denotes a calculating part which calculates the positional difference amount of the two pupil-divided images (A-image and B-image) with the above-described method. The calculating part 111 calculates the defocus amount x of the image-pickup optical system 101 on the basis of the above-described positional difference amount when the autofocus mode is selected through the focus mode switch 120.

Figure 5:
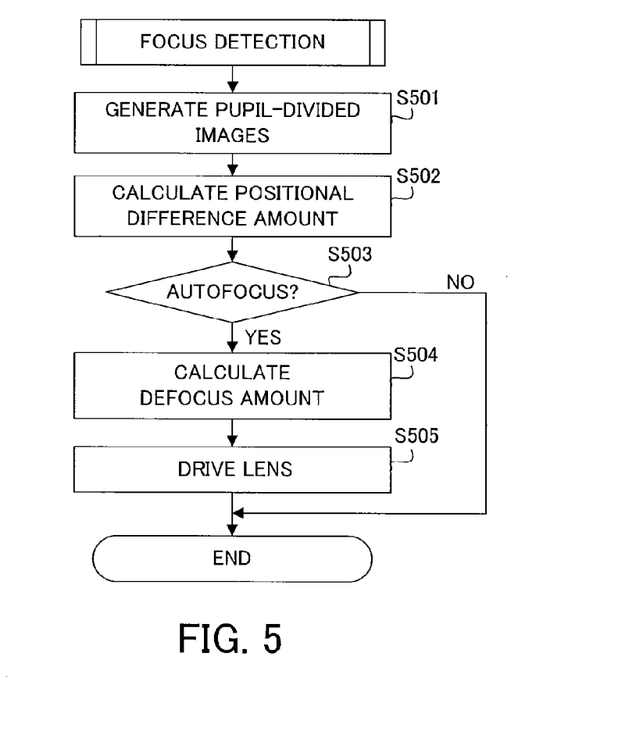
FIG. 5 is a flowchart showing focus detection processing and autofocus processing in Embodiment 1.

FIG. 5 is a flowchart showing focus detection processing and autofocus processing which are performed by the calculating part 111. At Step S501, the calculating part 111 generates two pupil-divided images (A-image and B-image) through the image-pickup optical element 102. Next, at Step S502, the calculating part 111 calculates the positional difference amount between the two pupil-divided images.

Moreover, at step S503, the calculating part 111 determines whether or not the camera is set in the autofocus mode. When the camera is in the autofocus mode, the process proceeds to step S504 where the calculating part 111 calculates the defocus amount x by the above-described calculation. At step S505, the calculating part 111 moves the focus lens 101a to an in-focus position on the basis of the calculated defocus amount x.

Further, in FIG. 1, reference numeral 112 denotes an image processing part. The image processing part 112 performs processing for generating a split image (split image data) from the A-image data and the B-image data generated by the pupil-divided image acquiring part 110 when the manual focus mode is set. In advance of generation of the split image, the image processing part 112 extracts color information from the main image generated by the signal processing part 104 on the basis of the respective positional difference amounts of the A-image and the B-image with respect to the third object image (in other words, on the basis of the respective positional difference amounts of the A-image in the A-image data and the B-image in the B-image data with respect to the main image) to synthesize the color information with the A-image data and the B-image data. The image processing part 112 adds the color information to positions in the A-image data and the B-image data, the positions corresponding to the respective positional difference amounts of the A-image and the B-image, which are the pupil-divided images with respect to the main image.

Thereby, a split image is generated from the A-image data and the B-image data to each of which the color information is added. As described above, the image processing part 112 adds the color information extracted from the main image on the basis of the respective positional difference amounts of the pupil-divided images with respect to the third object image (that is, the respective positional difference amounts of the A-image in the A-image data and the B-image in the B-image data with respect to the main image) to the split image. The calculating part 111 and the image processing part 112 constitute a split image generating part. Hereinafter, "the positional difference amounts of the A-image in the A-image data and the B-image in the B-image data with respect to the main image" are referred to as "the positional difference amounts of the A-image and the B-image with respect to the main image".

Reference numeral 105 denotes an image synthesizing part which superimposes the split image obtained by the image processing part 112 onto the main image obtained by the signal processing part 104. Thereby, a main image including the split image is generated. A displaying part 106 displays the main image including the split image thereon.

Figure 9:
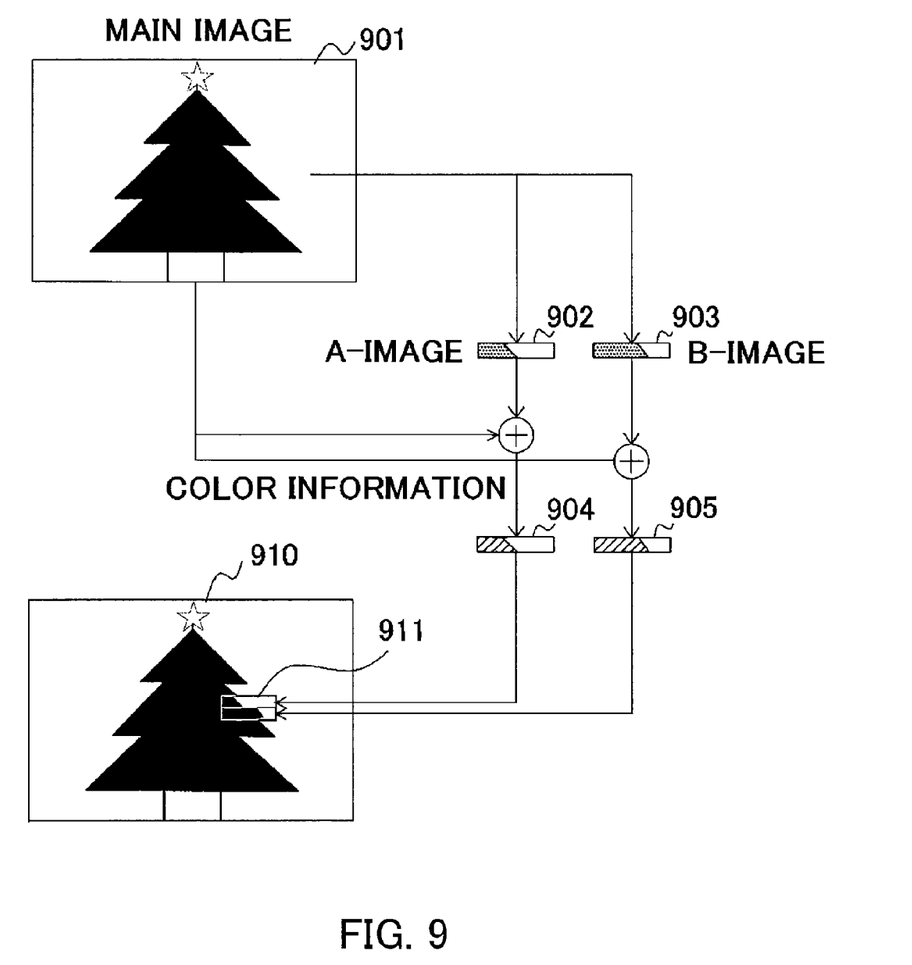
FIGS. 9 and 10 are pattern diagrams for explaining a procedure for generating a split image in Embodiment 1.

FIG. 9 schematically shows processing performed by the image processing part 112 and the image synthesizing part 105.

Reference numeral 901 denotes the main image generated by the signal processing part 104. Reference numerals 902 and 903 denote the A-image data and the B-image data (however, data of portions for generating the split image) generated by the pupil-divided image acquiring part 110. Synthesizing the color information extracted from the main image 901 with the A-image data 902 and the B-image data 903 provides color A-image data 904 and color B-image data 905. The image processing part 112 generates the split image on the basis of the color A-image data 904 and the color B-image data 905, and the image synthesizing part 105 superimposes the split image on a corresponding object area in the main image (in the third image). This provides a display image 910 serving as the main image including a color split image 911.

Figure 10:
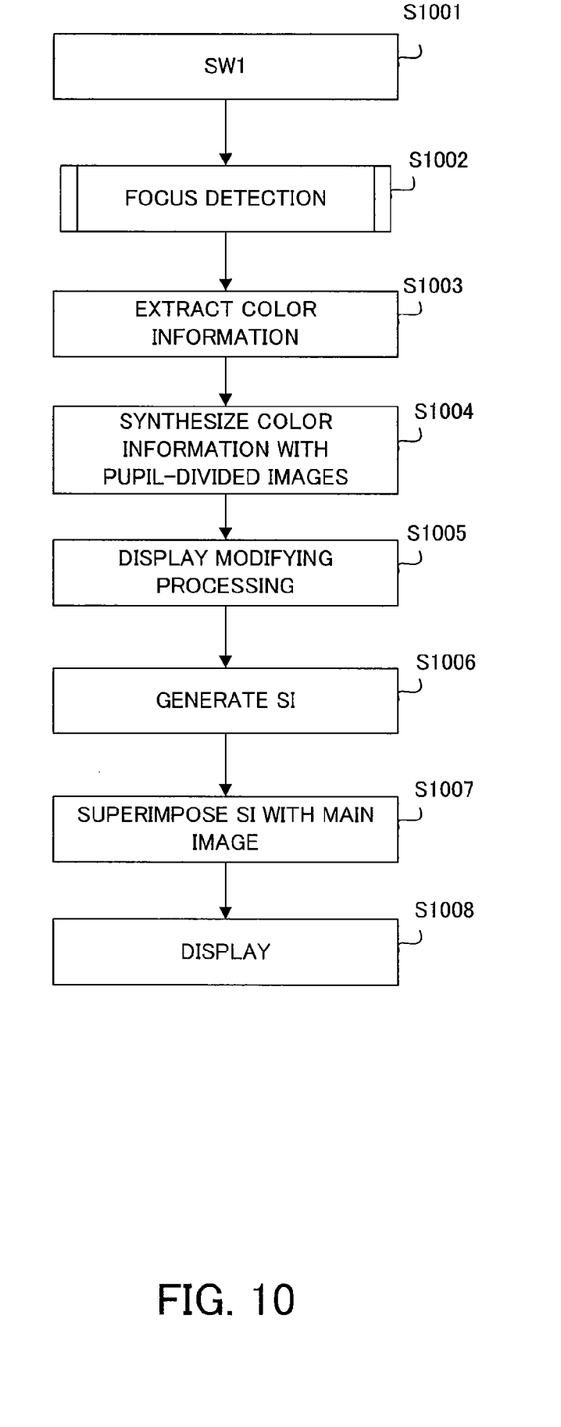

FIG. 10 shows a flowchart showing processing (image display method) from the focus detection performed by operating a release button (not shown) of the camera to display of the display image including the split image. The flowchart shows processing in a case in which the focus mode switch 120 has set to the manual focus mode.

At step S1001, when a user performs an operation (half-press operation) of the release button (SW1), the process proceeds to step S1002 where the calculating part 111 calculates the positional difference amounts of the A-image and the B-image with respect to the main image, the A-image and the B-image being the pupil-divided images in an object area which is a focus detection target area. The object area as the focus detection target area is set by a manual selection through an operation of a switch by the user or an automatic selection operation of the camera. The A-image and the B-image in the following description means an A-image and a B-image in the object area as the focus detection target area.

At step S1003, the image processing part 112 extracts the color information from the positions corresponding to the A-image and the B-image in the object area which is the focus detection target area (that is, area for generating the split image) in the main image on the basis of the positional difference amounts of the A-image and the B-image with respect to the main image.

Figure 11:
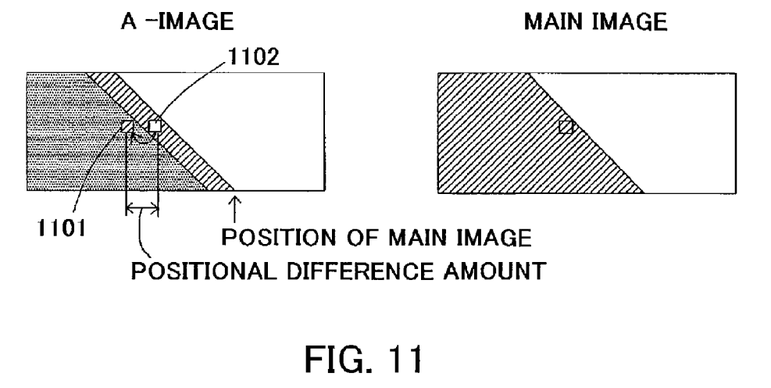
FIG. 11 is a diagram showing extraction of color information from a main image and synthesis thereof.

FIG. 11 shows a method for extracting the color information from the main image on the basis of the positional difference amounts of the A-image and the B-image with respect to the main image, to add the color information to the A-image data and the B-image data.

Reference numeral 1101 shown in the left figure of FIG. 11 denotes a pixel (hereinafter referred to as an A-pixel) in the A-image data. Reference numeral 1102 denotes a pixel in the main image shown in the right figure of FIG. 11, the pixel 1102 existing at a position shifted by the number of pixels corresponding to the above-described positional difference amount of the A-image data from a position in the main image coinciding with the position of the A-pixel 1101. The image processing part 112 extracts color information of the pixel 1102. Then, at step S1104, the image processing part 112 adds the extracted color information to the A-pixel 1101.

That is, the image processing part 112 extracts the color information of the pixel 1102 in the main image existing at the position shifted by the number of pixels corresponding to the positional difference amount of the A-image with respect to the main image from the pixel in the main image coinciding with the pixel 1101 in the A-image data. Then, the image processing part 112 adds the color information to the pixel 1101 in the A-image data.

Performing such extraction and addition of the color information for all pixels forming the A-image data and the B-image data generates the color A-image data and the color B-image data.

Next, at step S1005, the image processing part 112 performs display modifying processing with respect to the color A-image data and the color B-image data as needed. The display modifying processing is processing for modifying (changing) at least one of color density, brightness, display color, and shape of the A-image data and the B-image data (i.e., of the split image). As an example, the display modifying processing may be increase the color densities of the A-image data and the B-image data as the focus state approaches an in-focus state (in other words, as the positional difference amount [phase difference] between the A-image and the B-image decreases), or may blink the A-image data and the B-image data in an out-of-focus state where the positional difference amount is larger than a predetermined value.

At step S1006, the image processing part 112 generates the split image (SI) 911 by arranging the A-image data and the B-image data to each of which the color information has been added and on each of which the display modifying processing has been performed as needed, in their divided direction (in the vertical direction in FIG. 9). The processing from step S1001 to step S1006 is performed, when plural object areas are the focus detection target areas, for each of the object areas. Thereby, plural split images are generated.

Next, at step S1007, the image synthesizing part 105 superimposes the main image generated by the signal processing part 104 with one or plural split image(s) 911 generated at step S1006. The image synthesizing part 105 outputs the display image 910 serving as the main image including the color split image 911 which is formed in this way to display the display image 910 on the displaying part 106 at step S1008.

As described above, according to the present embodiment, the color information extracted from the main image on the basis of the positional difference amounts of the A-image and the B-image with respect to the main image is added to the split image generated from the A-image data and the B-image data. This enables display of the main image including the split image which does not cause the user to have an odd feeling on the displaying part 106 without using special elements. Further, the split image is generated from the A-image data and the B-image data generated by using the focus detection pixels discretely arranged on the image-pickup element 102, which enables the split image to be displayed at any position on the main image. Accordingly, even in a case in which plural objects having mutually different distances exist, this embodiment can display the split image for each of the objects.

Moreover, displaying the split image on which the display modifying processing is performed enables the user to easily confirm the focus state of the image-pickup optical system 101 when performing a manual focus operation.

In the present embodiment, the description was made of the case where the split image is generated from the A-image data and the B-image data after the color information extracted from the main image is added to the A-image data and the B-image data. However, a split image may be first generated from the A-image data and the B-image data, and thereafter the color information extracted from the main image may be added to the split image. These both cases add the color information to the split image.

[Embodiment 2]

Next, a second embodiment (Embodiment 2) of the present invention will be described. The configurations of the camera and the image-pickup element and the method for calculating the positional difference amounts of the A-image and the B-image in the present embodiment are the same as those in Embodiment 1. In the present embodiment, components having common or similar functions as those in Embodiment 1 are denoted by the same reference numerals in Embodiment 1.

Figure 12:
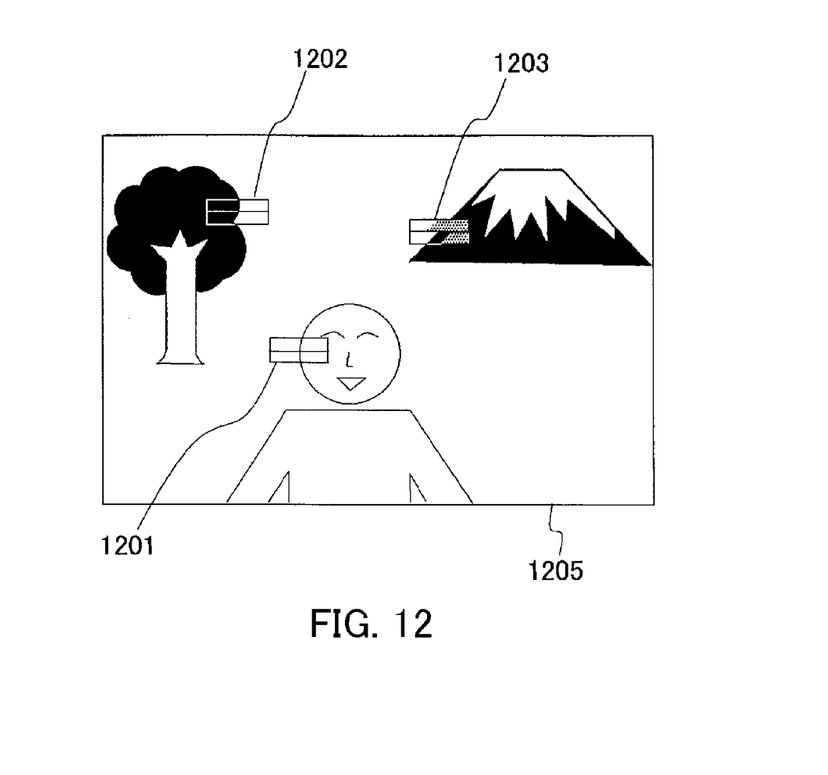
FIG. 12 is a diagram showing a display example of split images in a camera that is a second embodiment (Embodiment 2) of the present invention.

FIG. 12 shows an example of split images displayed on the displaying part 106 by the present embodiment. In the figure, reference numerals 1201 and 1202 denote color split images showing an in-focus state, and reference numeral 1203 denotes a monochrome split image showing an out-of-focus state.

Figure 13:
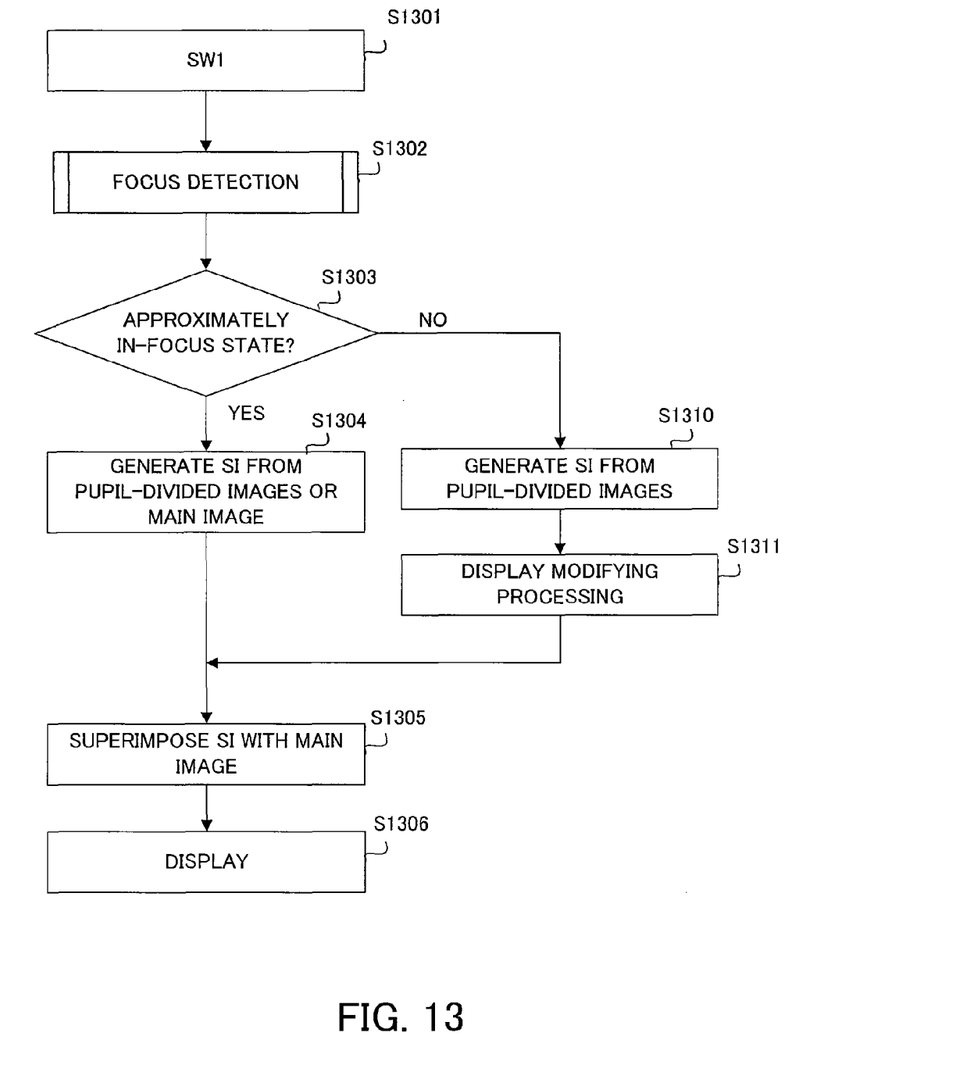
FIG. 13 is a flowchart showing a procedure for generating the split image in Embodiment 2.

The processing to display of the images shown in FIG. 12 will be described by using a flowchart of FIG. 13. This flowchart as well shows the processing in the case in which the focus mode switch 120 has set to the manual focus mode.

At step S1301, when a user performs an operation (half-press operation) of the release button (SW1), the process proceeds to step S1302 where the calculating part 111 calculates the positional difference amount between the A-image and the B-image which has been generated by the pupil-divided image acquiring part 110.

At step S1303, the calculating part 111 determines whether or not the calculated positional difference amount show an in-focus state or a state close to the in-focus state (hereinafter these are collectively referred to as an approximately in-focus state) or show an out-of-focus state. Specifically, when the calculated positional difference amount is smaller than (or, equal to or lower than) the predetermine value, the calculating part 111 determines that the focus state is the approximately in-focus state, and when the calculated positional difference amount is larger than the predetermine value, the calculating part 111 determines that the focus state is the out-of-focus state.

In the out-of-focus state, the process proceeds to step S1310 where the image processing part 112 generates a split image (SI) from the A image data and the B image data. Thereby, a monochrome split image having no color information is generated. At step S1311, the image processing part 112 performs the display modifying processing described in Embodiment 1.

On the other hand, in the in-focus state, at step S1304, the image processing part 112 generates a split images (SI) having color information. As described at steps S1003 to S1006 in Embodiment 1, the image processing part 112 may first add the color information extracted from the main image to the A image data and the B image data to generate the split image, or may generate the split image from the main image without using the A image data and the B image data. The both cases enable generation of a color split image having color information.

When plural object areas as focus detection targets exist, the processing at steps S1302 to S1304, the processing at step S1310 and the processing at step S1311 are performed for each of the plural object areas.

Next, at step S1305, the image synthesizing part 105 superimposes the main image generated in the signal processing part 104 with one or plural split images generated at step S1304 or at steps S1310 and S1311. The image synthesizing part 105 outputs a display image 1205 (refer to FIG. 9) including the color split images 1201 and 1202 and the monochrome split image 1203 to display the display image 1205 on the displaying part 106 at step S1306.

According to the present embodiment, the split image showing the out-of-focus state is displayed as the monochrome split image, and the split image showing the approximately in-focus state is displayed as the color split image. This enables, when plural objects having mutually different distances exist, the user to easily confirm the focus state of the image-pickup optical system 101 for each of the plural object to perform the manual focus operation. In particular, since the split image showing the approximately in-focus state is looked by the user, displaying this split image in colors enables the manual focus operation using the split image without causing the user to have an odd feeling.

In each of the above embodiments, the description was made of the case where the split image has a rectangular form and is divided in the vertical direction (FIG. 9 and FIG. 12). However, the shape and the divided direction of the split image are not limited thereto. The split image may have a circular form or may be divided in the horizontal direction.

Further, in each of the above embodiments, the description was made of the case where the single image-pickup element includes the first, second and third pixels. However, two or more image-pickup elements, for example, an image-pickup element for the pupil-divided images having the first and second pixels and an image-pickup element for the main image having the third pixels may be used.

According to each of the above embodiments, the split image is generated on the basis of the first image data and the second image data corresponding to the first object image and the second object image having a phase difference therebetween. Therefore, the split images respectively corresponding to plural objects having mutually different distances can be displayed. Additionally, the color information extracted from the third image (main image) is added to the split image and displayed in colors. A split image which hardly gives an odd feeling to the user can be displayed the main image. As a result, an image-pickup apparatus which is capable of displaying the split image in colors without using special elements and which is easy to perform the manual focus operation.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2007-322648, filed on Dec. 13, 2007, which is hereby incorporated by reference herein in its entirety.

What is claimed is:

1. An image-pickup apparatus comprising:
   an image acquiring part which respectively photoelectrically converts a first object image and a second object image that are formed by a first light flux and a second light flux into first image data and second image data, the first and second light fluxes being formed by dividing a light flux from an image-pickup optical system by a pupil divider, and which photoelectrically converts a third object image formed by a third light flux of the light flux from the image-pickup optical system into third image data, the third light flux being not divided by the pupil divider;
   a displaying part which displays the third image data; and
   a split image generating part which generates split image data to be displayed in the third image data,
   wherein the split image generating part generates the split image data based on the first image data and the second image data, and adds color information extracted from the third image data to the split image data, and wherein the split image generating part extracts the color information from the third image data on the basis of positional difference amounts of the first and second object images with respect to the third object image.

2. The image-pickup apparatus according to claim 1, wherein the image acquiring part is constituted by a single image-pickup element including first pixels and second pixels which respectively photoelectrically convert the first object image and the second object image, and third pixels which photoelectrically convert the third object image.

3. An image display method for an image pickup-apparatus having a displaying part comprising:
   a first step of respectively photoelectrically converting a first object image and a second object image that are formed by a first light flux and a second light flux into first image data and second image data, the first and second light fluxes being formed by dividing a light flux from an image-pickup optical system by a pupil divider, and which photoelectrically converting a third object image formed by a third light flux of the light flux from the image-pickup optical system into third image data, the third light flux being not divided by the pupil divider; and
   a second step of generating split image data to be displayed in the third image data displayed on the displaying part, wherein the second step adds color information extracted from the third image data to the split image data, and wherein the split image generating part extracts the color information from the third image data on the basis of positional difference amounts of the first and second object images with respect to the third object image.

4. An image-pickup apparatus comprising:
   an image acquiring part which respectively photoelectrically converts a first object image and a second object image that are formed by a first light flux and a second light flux into first image data and second image data, the first and second light fluxes being formed by dividing a light flux from an image-pickup optical system by a pupil divider, and which photoelectrically converts a third object image formed by a third light flux of the light flux from the image-pickup optical system into third image data, the third light flux being not divided by the pupil divider;
   a displaying part which displays the third image data; and
   a split image generating part which generates split image data to be displayed in the third image data,
   wherein the split image generating part generates the split image data based on the first image data and the second image data, and adds color information extracted from the third image data to the split image data, and
   wherein the split image generating part changes a color density of the split image data in accordance with a phase difference between the first and second object images.

5. An image display method for an image pickup-apparatus having a displaying part comprising:
   a first step of respectively photoelectrically converting a first object image and a second object image that are formed by a first light flux and a second light flux into first image data and second image data, the first and second light fluxes being formed by dividing a light flux from an image-pickup optical system by a pupil divider, and which photoelectrically converting a third object image formed by a third light flux of the light flux from the image-pickup optical system into third image data, the third light flux being not divided by the pupil divider; and
   a second step of generating split image data to be displayed in the third image data displayed on the displaying part, wherein the second step adds color information extracted from the third image data to the split image data,
   wherein the split image generating part changes a color density of the split image data in accordance with a phase difference between the first and second object images.

6. The image-pickup apparatus according to claim 4, wherein the image acquiring part is constituted by a single image-pickup element including first pixels and second pixels which respectively photoelectrically convert the first object image and the second object image, and third pixels which photoelectrically convert the third object image.

* * * * *